US011332006B2

(12) United States Patent
Roger et al.

(10) Patent No.: US 11,332,006 B2
(45) Date of Patent: May 17, 2022

(54) SYSTEM FOR ASSISTING THE DRIVING OF A TRAILER FROM AN OPEN TIPPING HYDRAULIC CIRCUIT

(71) Applicant: POCLAIN HYDRAULICS INDUSTRIE, Verberie (FR)

(72) Inventors: Fabien Roger, Verberie (FR); Cedric Magnien, Verberie (FR); Gery Depierre, Verberie (FR); David Devred, Verberie (FR); Loris Taxil, Verberie (FR); Matej Erznoznik, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 161 days.

(21) Appl. No.: 16/344,755

(22) PCT Filed: Oct. 24, 2017

(86) PCT No.: PCT/EP2017/077200
§ 371 (c)(1),
(2) Date: Apr. 24, 2019

(87) PCT Pub. No.: WO2018/077899
PCT Pub. Date: May 3, 2018

(65) Prior Publication Data
US 2019/0329649 A1 Oct. 31, 2019

(30) Foreign Application Priority Data

Oct. 25, 2016 (FR) ...................................... 1660329

(51) Int. Cl.
*B60K 7/00* (2006.01)
*B62D 59/04* (2006.01)
(Continued)

(52) U.S. Cl.
CPC ............ *B60K 25/06* (2013.01); *B60K 7/0015* (2013.01); *B60K 17/14* (2013.01); *B60P 1/162* (2013.01);
(Continued)

(58) Field of Classification Search
CPC .... B60K 7/0015; B60K 17/14; B60K 17/356; B60K 2025/065
See application file for complete search history.

(56) References Cited

U.S. PATENT DOCUMENTS 4,171,054 A * 10/1979 Tanaka .................... E02F 3/964
212/288
5,009,545 A * 4/1991 Coleman ................. B21F 33/00
404/100

(Continued)

FOREIGN PATENT DOCUMENTS

CN 101500836 A 8/2009
CN 103011016 A 4/2013
(Continued)

OTHER PUBLICATIONS

Preliminary Research Report received for French Application No. 1660329, dated Jul. 10, 2017, 2 pages (1 page of French Translation Cover Sheet and 1 page of original document).
(Continued)

*Primary Examiner* — Michael Leslie
(74) *Attorney, Agent, or Firm* — Womble Bond Dickinson (US) LLP

(57) ABSTRACT

The present invention concerns a hydraulic system comprising a hydraulic pump (130) installed on a truck tractor (10), a hydraulic pipe (160) connected to the outlet of the pump (130) and a connector (170) positioned at the outlet of the pipe (160) and designed to be connected to a complementary socket (180) provided on a trailer (20) in order to supply a
(Continued)

Figure 1:
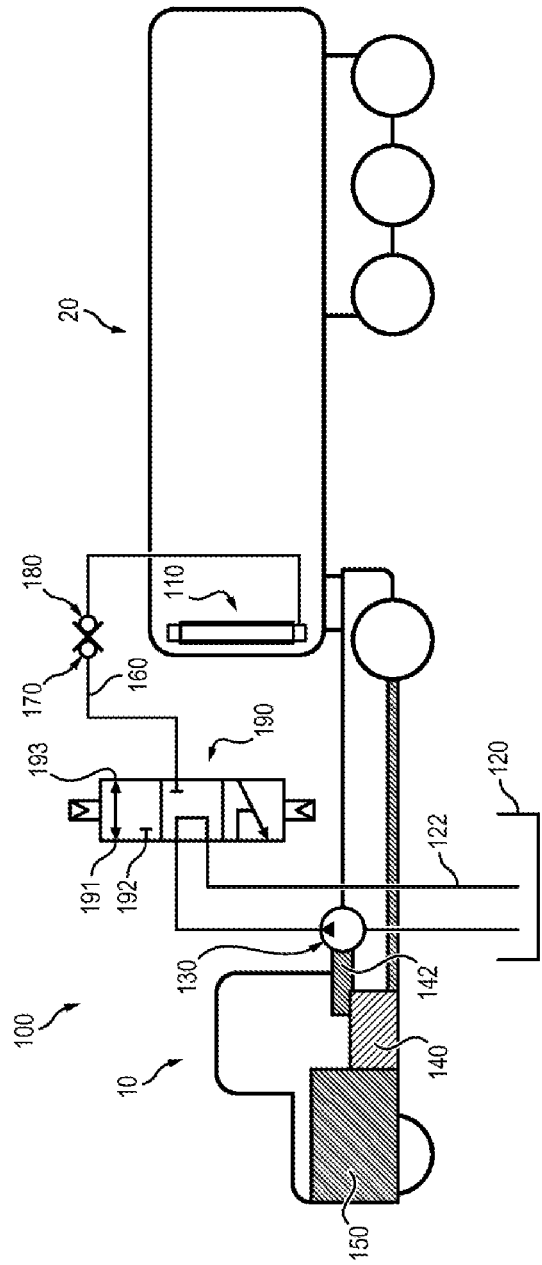

ram (110) positioned on the trailer, for example for tipping purposes, characterised by the fact that it comprises a circuit selector (210) designed to connect said socket (180) selectively either to a ram (110) or a conduit (220) supplying a drive assistance circuit and an assistance circuit return conduit (250) designed to be connected to a tank (120) positioned on the truck tractor.

25 Claims, 5 Drawing Sheets

(51) Int. Cl.
  *F15B 11/16* (2006.01)
  *B60K 25/06* (2006.01)
  *B60K 17/14* (2006.01)
  *B60P 1/16* (2006.01)
  *F15B 20/00* (2006.01)
  *F15B 21/041* (2019.01)

(52) U.S. Cl.
  CPC .............. *B62D 59/04* (2013.01); *F15B 11/16* (2013.01); *F15B 20/00* (2013.01); *F15B 21/041* (2013.01); *B60K 2025/065* (2013.01); *F15B 2211/20523* (2013.01); *F15B 2211/7135* (2013.01)

(56) References Cited

U.S. PATENT DOCUMENTS

| | | | | |
|---|---|---|---|---|
| 6,186,596 | B1 | 2/2001 | Jones | |
| 6,336,518 | B1 * | 1/2002 | Matsuyama | ........ F16H 61/4078 180/306 |
| 7,398,805 | B2 * | 7/2008 | Dubbs | .................. A01G 23/067 144/218 |
| 7,591,628 | B2 * | 9/2009 | Noonan | ............... A01D 87/127 100/89 |
| 8,061,466 | B2 | 11/2011 | Carlton et al. | |
| 10,654,354 | B2 * | 5/2020 | HÖßLe et al. | ......... B62D 13/00 |
| 2002/0175009 | A1 | 11/2002 | Kress | |
| 2010/0018728 | A1 | 1/2010 | Bright et al. | |

FOREIGN PATENT DOCUMENTS

| | | | |
|---|---|---|---|
| CN | 105083093 A | 11/2015 | |
| DE | 1921848 U | 8/1965 | |
| EP | 0399932 A1 | 11/1990 | |
| EP | 0993982 A1 | 4/2000 | |
| FR | 2035214 A5 | 12/1970 | |
| FR | 2142300 A5 | 1/1973 | |
| FR | 2379394 A1 | 9/1978 | |
| FR | 2935128 A1 | 2/2010 | |
| GB | 1284984 A | 8/1972 | |
| JP | 59176130 A * | 10/1984 | .............. B60P 3/224 |
| WO | 2012/123056 A1 | 9/2012 | |
| WO | 2018/050468 A1 | 3/2018 | |

OTHER PUBLICATIONS

International Search Report and Written Opinion received for PCT Patent Application No. PCT/EP2017/077200, dated Feb. 28, 2018, 15 pages (6 Pages of English Translation and 9 pages of Original Document).
International Preliminary Report on Patentability received for PCT Patent Application No. PCT/EP2017/077200, dated May 9, 2019, 12 pages (6 pages of English Translation and 6 pages of Original Document).
Office Action received for European Patent Application No. 17794288. 5, dated Aug. 18, 2020, 8 pages (2 pages of English Translation and 6 pages of Original Document).
Office Action received for Chinese Patent Application No. 201780079673.2, dated Oct. 13, 2021, 8 pages.
Office Action received for Indian Patent Application No. 201917020194, dated May 25, 2021, 7 pages.

* cited by examiner

SYSTEM FOR ASSISTING THE DRIVING OF A TRAILER FROM AN OPEN TIPPING HYDRAULIC CIRCUIT

The present invention relates to the field of assistance circuits in the driving of vehicles.

More specifically, the present invention relates to the trailer driving assistance.

Various systems have already been proposed for ensuring assistance to the driving of trailers.

Examples of known systems can be found in documents FR 2379394, EP 0399932, EP 0993982, FR 2935128 and WO2012/123056.

A number of these known devices are generally satisfactory.

However, most of these devices are complex and expensive.

Moreover, although the general structure of driving assistance circuits comprising hydraulic engines mechanically coupled to wheel axles is known for a long time as shown in the above-mentioned document FR 2379394 filed in 1977, namely nearly 40 years ago, the systems proposed for the assistance to the driving of trailers have not really developed in recent years.

In particular, to the knowledge of the applicant, no system has been proposed so far to enable effective assistance to the driving of a trailer using an open-circuit supply circuit placed on a towing vehicle and intended to supply a cylinder, in particular a cylinder for a tipping operation. The open circuit comprises a pressure-free hydraulic fluid tank, a hydraulic machine forming a pump, a circuit that can include hydraulic receivers, hydraulic lines, and a return line towards the tank.

The applicant therefore notices a flagrant lack in the state of the art.

The present invention therefore aims to improve the state of the art.

This object is achieved according to the invention by means of a system comprising a hydraulic pump installed on a towing vehicle, a hydraulic hose connected to the outlet of the pump and a connection placed at the outlet of the aforementioned hose and adapted to be connected to a complementary socket provided on a trailer to allow the supply of a cylinder placed on the trailer, for example for tipping purposes, characterized in that it comprises a circuit selector adapted to connect said socket selectively either towards a cylinder, or towards a supply duct of a driving assistance circuit and a return duct of the assistance circuit adapted to be connected to a tank placed on the towing vehicle.

Those skilled in the art will understand that the simple addition of a selector and a return duct, as recommended within the context of the present invention, can completely transform the capabilities of systems existing for many years, by offering a driving assistance capacity impossible so far.

The invention also relates to a method for producing a circuit for assisting the driving of a trailer from an existing assembly, using a system of the aforementioned type and the vehicles equipped with a system of the aforementioned type.

Figure 2:
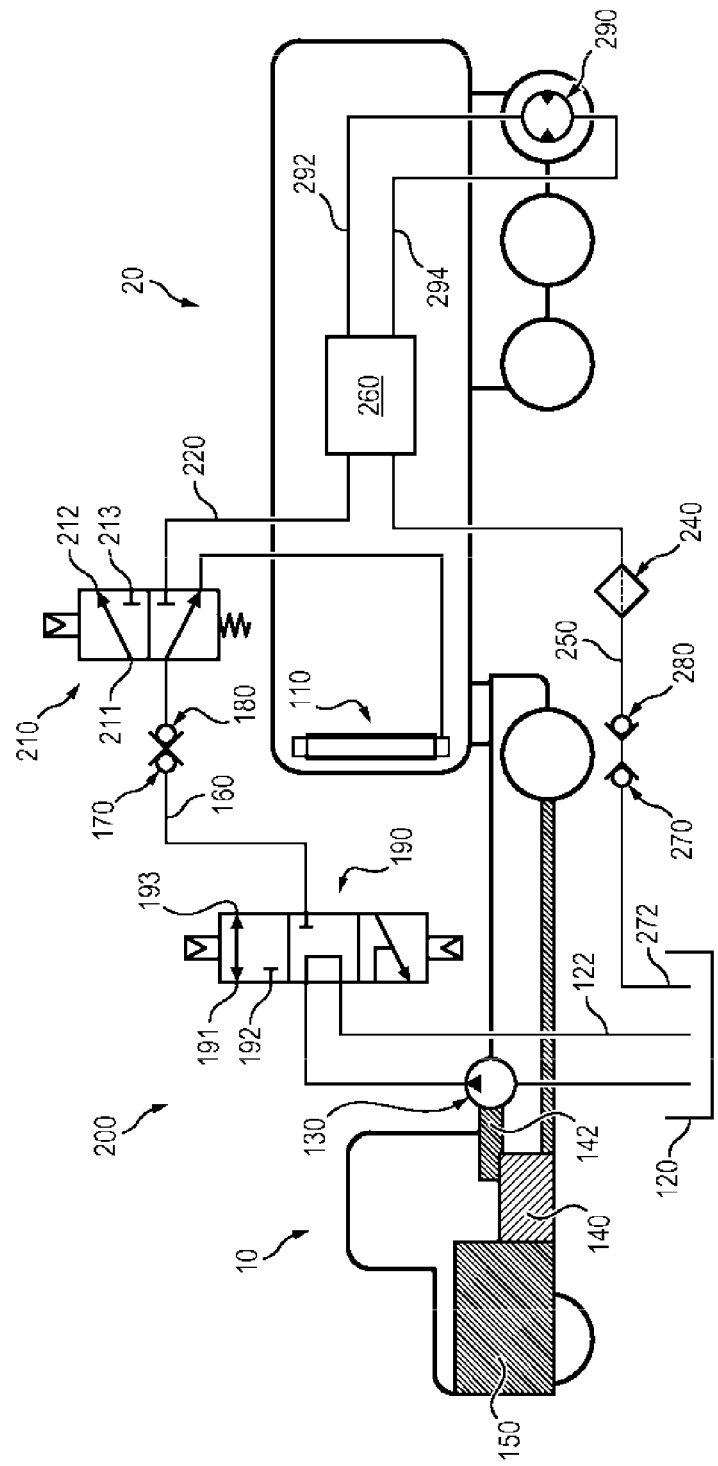

Further characteristics, objects and advantages of the present invention will become apparent upon reading the following detailed description in light of the appended drawings given by way of non-limiting examples and in which:

FIG. 1 represents a schematic view of a structure known from the state of the art of a hydraulic circuit designed for the supply of a tipping cylinder, FIG. 2 schematically represents a circuit according to the present invention allowing to complete the known hydraulic circuit for a tipping operation in order to carry out an assistance to the driving of a trailer, and FIGS. 3, 4, 5, 6 and 7 represent different variants of particular means capable of being integrated within the context of the present invention to ensure the safety of a circuit common to a first assistance function and a second function, for example a tipping function.

The appended FIG. 1 schematically represents a towing vehicle 10 and a trailer 20 adapted to be attached to the rear of the towing vehicle and towed thereby and a hydraulic circuit 100 placed substantially on the towing vehicle 10 and adapted to selectively drive a cylinder 110 for the purpose of tipping the trailer 20.

More still precisely, the appended FIG. 1 shows a tank 120, a hydraulic pump 130 whose shaft is connected to an outlet or power take-off 142 directly or indirectly associated with a main engine, such as a heat engine 150. This power take-off can also be driven via a gearbox 140.

The pump 130, when driven by the power take-off 142 is adapted to take oil from the tank 120 and direct it towards the tipping cylinder 110.

To this end, the outlet of the pump 130 is connected to a hydraulic connection hose 160 in turn connected to a connection 170 placed at the outlet of the hose 160 and adapted to be connected, via a complementary socket or connection 180 provided on the trailer 20, to the tipping cylinder 110.

A control distributor 190 can be placed on the duct 160 as illustrated in FIG. 1. According to the configuration given in FIG. 1, the distributor 190 is of the three-way, three-position type. The two inlets 191, 192 of the distributor 190 are respectively connected to the outlet of the pump 130 and to a return duct 122 communicating with the tank 120. The outlet 193 of the distributor 190 is connected to the hose 160 communicating with the connector 170.

In the rest position, the two inlets 191 and 192 are connected together and the outlet 160 is isolated. The outlet of the pump 130 thus communicates on a loop with the tank 120.

In the working position, the inlet 191 is connected to the outlet 193 and the pump 130 supplies the cylinder 110 via the distributor 190 and the link 170, 180 in order to ensure a tipping operation.

In the release or discharge position, the first inlet 191 and the outlet 193 are connected to the second inlet 192 in order to return the oil to the tank 120. The cylinder 110 is then retracted.

Such a known circuit for supplying a tipping cylinder 110 as illustrated in FIG. 1 does not allow ensuring assistance to the driving of the trailer 20.

As illustrated in the appended FIG. 2, according to the invention, it is proposed to produce a new hydraulic circuit 200 by adding to the known hydraulic circuit as illustrated in FIG. 1, on the one hand, a circuit selector 210 and, on the other hand, a return duct 250.

The selector 210 is adapted to connect the socket 180 connected to the outlet of the pump 130 selectively, either towards the cylinder 110, or towards a supply duct 220 of the driving assistance circuit.

The return duct 250 of the assistance circuit is adapted to be connected to the tank 120 placed on the towing vehicle.

For this purpose, the duct 250 is connected to a connection 280 comparable to the connection 180. The connection 280 is intended to be connected to a connector 270 similar to the connector 170, itself opening onto a duct 272 which ends in the tank 120.

The selector 210 is typically of the three-way, two-position type. The inlet 211 of the selector is connected to the connection 180. The two outlets 212, 213 of the selector 210 are respectively connected to the supply duct 220 of the driving assistance circuit and to the inlet of the tipping cylinder 110.

In a first position of the selector, the inlet 211 is connected to the outlet 212. In this position, the hydraulic circuit supplies engines 290 associated with wheels of the trailer.

At least one engine 290 is provided respectively on the right and left wheels of the same axle.

The various engines 290 associated with a common axle are hydraulically mounted in parallel.

Within the context of the invention, engines 290 can be provided on several axles.

In an equivalent manner, it is also possible to provide for a single engine driving an axle, this axle including or not including a differential gear.

In the second position of the selector 210, the inlet 211 is connected to the second outlet 213. In this position, the hydraulic circuit supplies, in a manner known per se, the cylinder 110 to carry out a tipping operation.

The engines 290 fitted to some of the wheels of the trailer are preferably radial piston engines. It is particularly advantageous for the engine 290 to be a multilobe cam radial piston engine, and preferably an engine rotating at the speed of the wheels or of the axle input shaft.

The configuration of such radial piston engines is well known per se. The POCLAIN Company has in particular proposed various models of such radial piston engines. The structure and operation of such radial piston engines will therefore not be described in more detail later.

In FIG. 2, reference 292 is made to an inlet of an engine 290 connected to the duct 220 via a control circuit 260 and reference 294 is made to the outlet of the engine 290 connected to the return duct 250.

The control circuit 260 may comprise any equipment known to those skilled in the art to ensure proper operation of the pump 290 supply circuit, in particular any pressure limiting means for protecting the engine 290.

In FIG. 2, reference 240 is made to a filter placed on the return duct 250 and intended to filter the oil flowing through the circuit before it returns to the tank 120.

The control interface, or man-machine interface made available to the driver on the towing vehicle 10 is known per se. It typically comprises two controls: on the one hand, a power take-off engagement switch 142 for driving the pump 130, preferably with an activation return light and, on the other hand, a lifting/lowering tipping lever for controlling the tipping cylinder 110.

Within the context of the invention, the default active circuit is preferably the assistance so that the risk of tipping is eliminated when the hydraulic assistance is desired. Thus, the distributor 210 is biased to rest in the connection position of the inlet 211 connected to the pump 130 with the outlet 212 connected to the supply duct of the driving assistance circuit 220.

Within the context of the invention, the interface made available to the driver on the vehicle further comprises a selection switch for disabling the assistance by switching the distributor 210 in its second position in order to put the tipping selector into service.

Within the context of the invention, the procedure for ensuring the tipping through the supply of the cylinder 110 is essentially as follows:
  selecting the deactivation of the driving assistance circuit by steering the selector 210, engaging the power take-off 142 to drive the pump 130, and
  controlling the tipping with the corresponding lever.

The procedure for providing driving assistance within the context of the invention is essentially as follows:
  selecting the assistance mode by steering the distributor 210 in the appropriate position,
  engaging the power take-off 142 to supply the pump 130, and
  engaging the assistance.

According to a particular embodiment, in order to facilitate the adaptation of the hydraulic circuit according to the invention on existing towing vehicles, the return duct 272 opens onto the cap of this tank 120. This arrangement makes it possible to simply use a standard dump hydraulic system, without modifying the tank body for adding a hydraulic tapping, since it suffices to replace the usual cap with a special cap, including a hydraulic tapping and easy to implement. This particular embodiment therefore makes it possible to create variants of an assisted vehicle without modifying the usual oil tank.

According to another arrangement of the invention, the assistance triggering valve 210 can be controlled via another control diverted from its primary normal use, in particular a switch located in the operator compartment, for example a fog lamp switch. In this case, when the fog lights are turned on, the assistance 210 is triggered at the same time, and becomes active if the distributor 190 is actuated.

Of course, the present invention is not limited to the particular embodiments that have just been described but extends to any variant in accordance with its spirit.

Those skilled in the art will understand upon reading the foregoing description that the invention has many advantages compared to the state of the art. It provides an optimized circuit for assisting the driving of a trailer based on a conventional tipping circuit, with the addition of simple, reliable and inexpensive components.

The present invention thus makes it possible to propose a trailer assistance system compatible with the known hydraulic trailer tipping systems without major modification of the hydraulic system.

The invention also makes it possible to work safely. The invention makes it possible to avoid any risk of tipping when using the assistance by means of the selector 210.

The assistance system described in the present application and based on the hydraulic engine 290 can be placed on wheels other than those of a trailer. It can, by using the pump 130 of open-loop hydraulic accessories, be associated for example with axles carrying a truck, in particular a directional front axle, multiple directional axles, lift axles, etc.

As indicated above, FIGS. 3, 4, 5, 6 and 7 represent different variants of particular means capable of being integrated, within the context of the present invention for ensuring the safety of a common circuit, to a first assistance function carried out by means of the engines 290 and to a second function, for example a tipping function, carried out using the cylinder 110.

The means illustrated in FIGS. 3, 4, 5, 6 and 7 are aimed to prevent an oil flow rate generated by the pump 130 from actuating a wrong hydraulic component in the event of deficiency (for example actuating the dump cylinder 110 or a hydraulic engine 290, if this is not desired). Such an accidental actuation may possibly occur in the event of unsteering of the selection valve 210 mentioned above, that is to say in the event of failure of this component or its steering. It is understood, for example, that in the event of unsteering of the selection valve 210 leading to an undesired actuation of the tipping control cylinder 110, a lifting of the dump cylinder 110 creates safety risks, particularly if this undesired actuation of the cylinder 110 is performed when the vehicle runs with the assistance.

Generally, the additional means according to the present invention, illustrated in FIGS. 3, 4, 5, 6 and 7, are aimed to guarantee that the means for controlling the fluid stream or for cutting-off the fluid stream remain in the desired position in order to prevent unexpected supply of a wrong component, in particular the tipping control cylinder 110.

Figure 3:
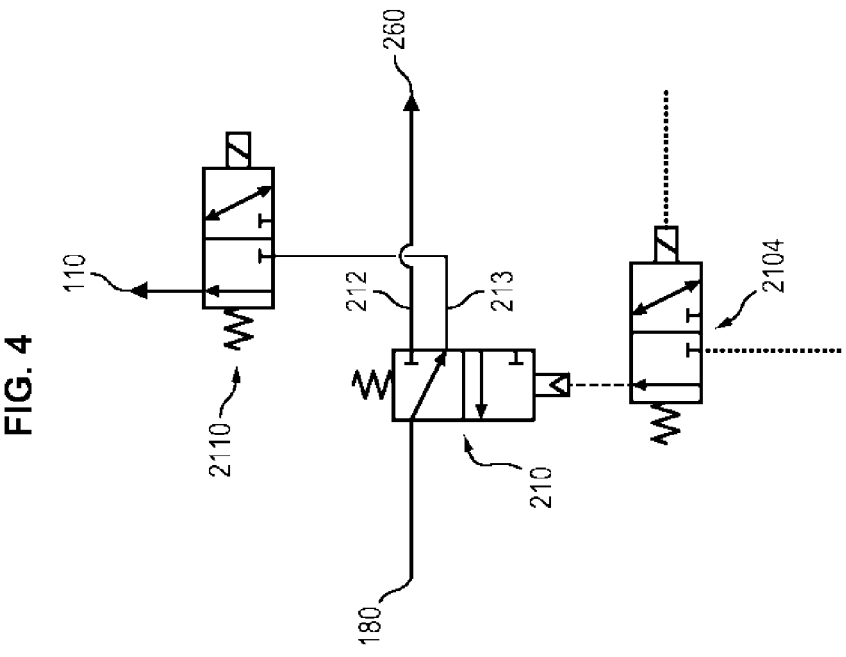

According to the first embodiment illustrated in FIG. 3, it is provided according to the invention that the selection valve 210 which makes it possible to choose to supply either the dump cylinder 110, or the engines 290 of the hydraulic axle, is not a monostable valve as illustrated in FIG. 2, but a bistable valve.

Such a bistable valve 210 requires, in a manner known per se, a positive control, i.e. a voluntary control, to change position in each direction. It therefore requires two controls. In FIG. 3, these two controls are referenced 2100 and 2102. They can be the subject of several embodiments and therefore will not be described in detail later.

Such a bistable selection valve 210 makes it possible to guarantee that its spool remains in position, even in the event of a break in its steering control, i.e. it makes it possible to maintain the position of the selection valve 210 in the event of loss of its control, whether it is hydraulic, pneumatic or electrical.

According to the invention, however, the bistable selection valve 210 also includes a manual control function making it possible to manually steer a return to the initial state of this valve 210 and thus to guarantee the use of the dump when desired, whatever the configuration of the vehicle.

Figure 4:
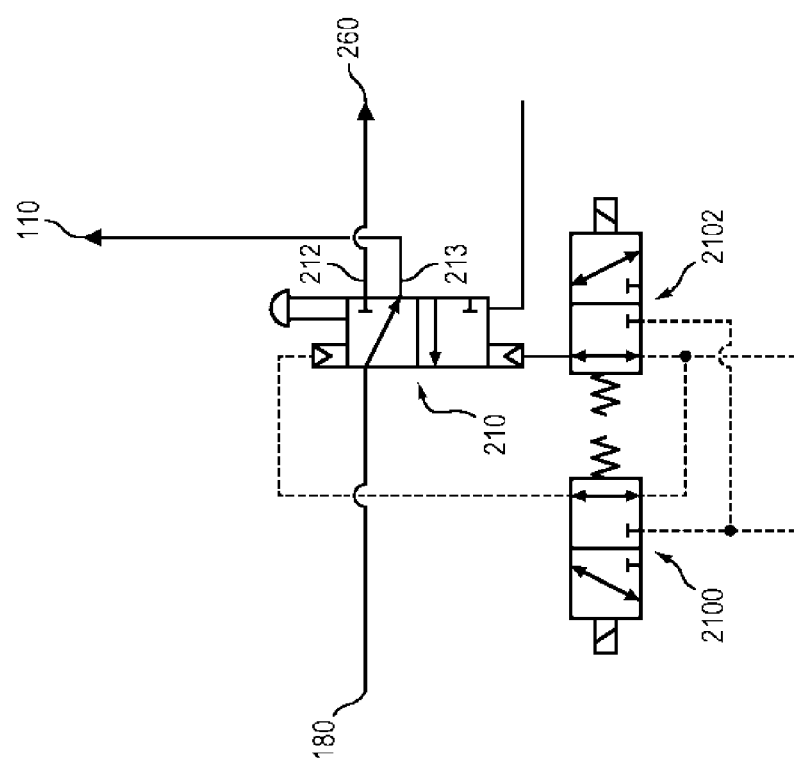

According to the second embodiment illustrated in FIG. 4, a safety valve 2110 is interposed between the outlet 213 of the selection valve 210 and the inlet of the cylinder 110. The selection valve 210 can also be bistable in this case. However, in this case, the selection valve 210 is preferably monostable as illustrated in FIG. 4 (its control is referenced 2104 in FIG. 4).

More specifically preferably within the context of this second embodiment, the selection valve 210 is normally open towards the tipping, while the safety valve 2110 is a cut-off valve normally closed on the tipping, but open to order, for example using an electrical signal from the central processing unit that steers the system.

Again, this safety valve 2110 may also include a manual control function for manually steering a return to the initial state of this valve 2110 and thus ensuring the use of the dump when desired, whatever the configuration of the vehicle.

The fact of providing that the selection valve 210 is normally open towards the tipping and not towards the assistance circuit, ensures that in case of failure, the assistance is unlikely to be engaged in an undesired manner.

Alternatively, it can be provided within the context of this second embodiment that the selection valve 210 is normally open towards the assistance circuit, while a safety valve 2110 formed of a normally closed cut-off valve, is interposed between the outlet of the selection valve 210 dedicated to the assistance circuit and the engines of the assistance circuit.

Figure 5:
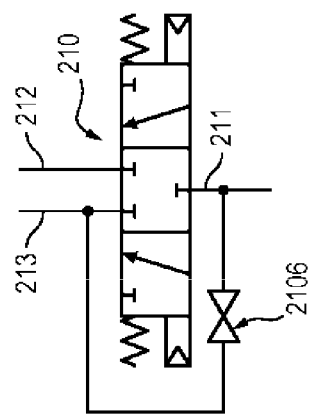

According to the third embodiment illustrated in FIG. 5, the selection valve 210 is a closed-center three-position valve. In a first position, the selection valve 210 connects the pump outlet 130 to the inlet of the cylinder 110. In a second position, the selection valve 210 connects the pump outlet to the inlet of the assistance circuit. And in the intermediate position, called "closed-center", the selection valve 210 is closed, i.e. each of its inlets and outlets 211, 212 and 213 is isolated. In the event of a break in the control, such a selection valve 210 takes its closed-center position and thus closes all the links in the event of a break, without risk of switching between the first and the second positions or vice versa.

The use of such a closed-center three-position selection valve 210 makes it possible to secure the systems, dump and assistance, in case of various problems.

The selection valve 210 illustrated in FIG. 5 may also include a manual control function making it possible, for example, to turn on a short-circuit 2016 of its spool in order to force the supply of a chosen circuit, for example of the cylinder 110 and thus for example of the tipping.

Figure 6:
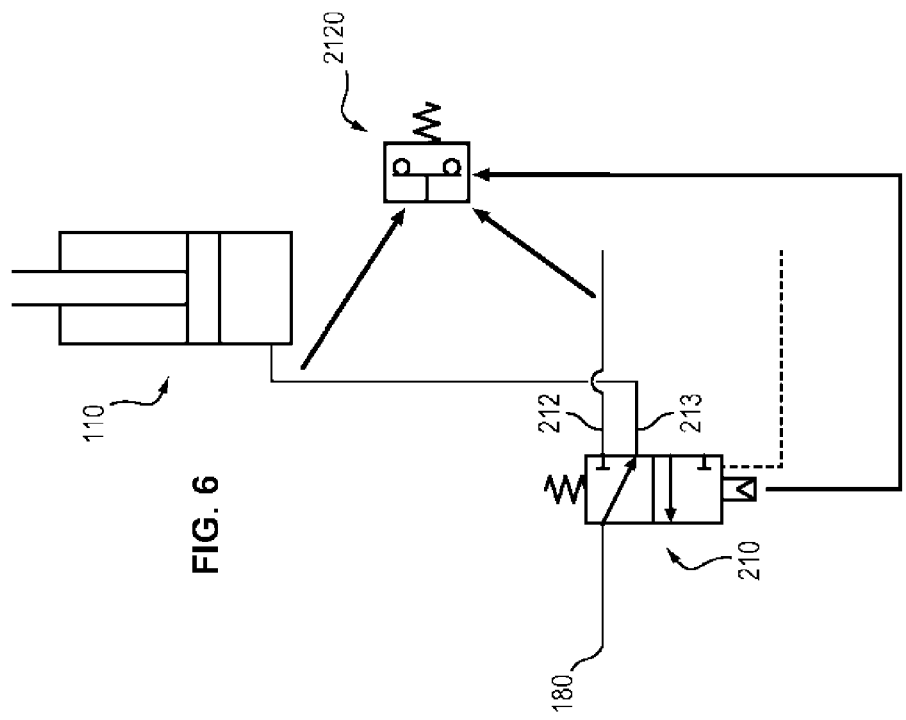

According to the fourth embodiment illustrated in FIG. 6, the system comprises at least one pressure sensor 2120 adapted to switch a component of the system during the detection of a deficiency, for example to isolate the pump 130, cut-off the pump 130 supply or interrupt the flow rate of the pump by steering a valve associated with the pump 130.

The pressure sensor 2120 can measure the pressure at different points of the circuit. It can be formed of a sensor that accurately measures the pressure or of a simple switch sensitive to pressure (even a lack of pressure for example on the assistance circuit) or to a position.

It can for example measure the pressure at the supply line of the cylinder 110 by stopping the flow rate source, for example by stopping the pump 130, in case of detection of a non-conforming pressure.

However, the pressure sensor 2120 can be subject of further implantations. It can for example measure the pressure in the selection valve 210. It can be formed of a contact sensor linked to the position of the spool of the selection valve 210 or of an HP pressure sensor at the inlet of a distributor valve located on the assistance circuit, in order to detect an unexpected supply of the cylinder 110 and therefore an undesired lifting of the dump or of the assistance circuit. In this case, the central control unit is for example adapted to transmit a signal for short-circuiting or isolating the pump 130 in order to stop the dump lifting and secure the system. Generally, it is about neutralizing the pump relative to the considered hydraulic circuit, i.e. making it hydraulically inactive on the circuit.

In FIG. 6 the above-mentioned pressure sensor is schematically represented with the reference 2120 and illustrated in a possible interaction with the supply line of the cylinder 210 to measure its supply pressure, with the control of the selection valve 210 and alternatively or complementarily with the supply line of the assistance circuit to measure its supply pressure.

Figure 7:
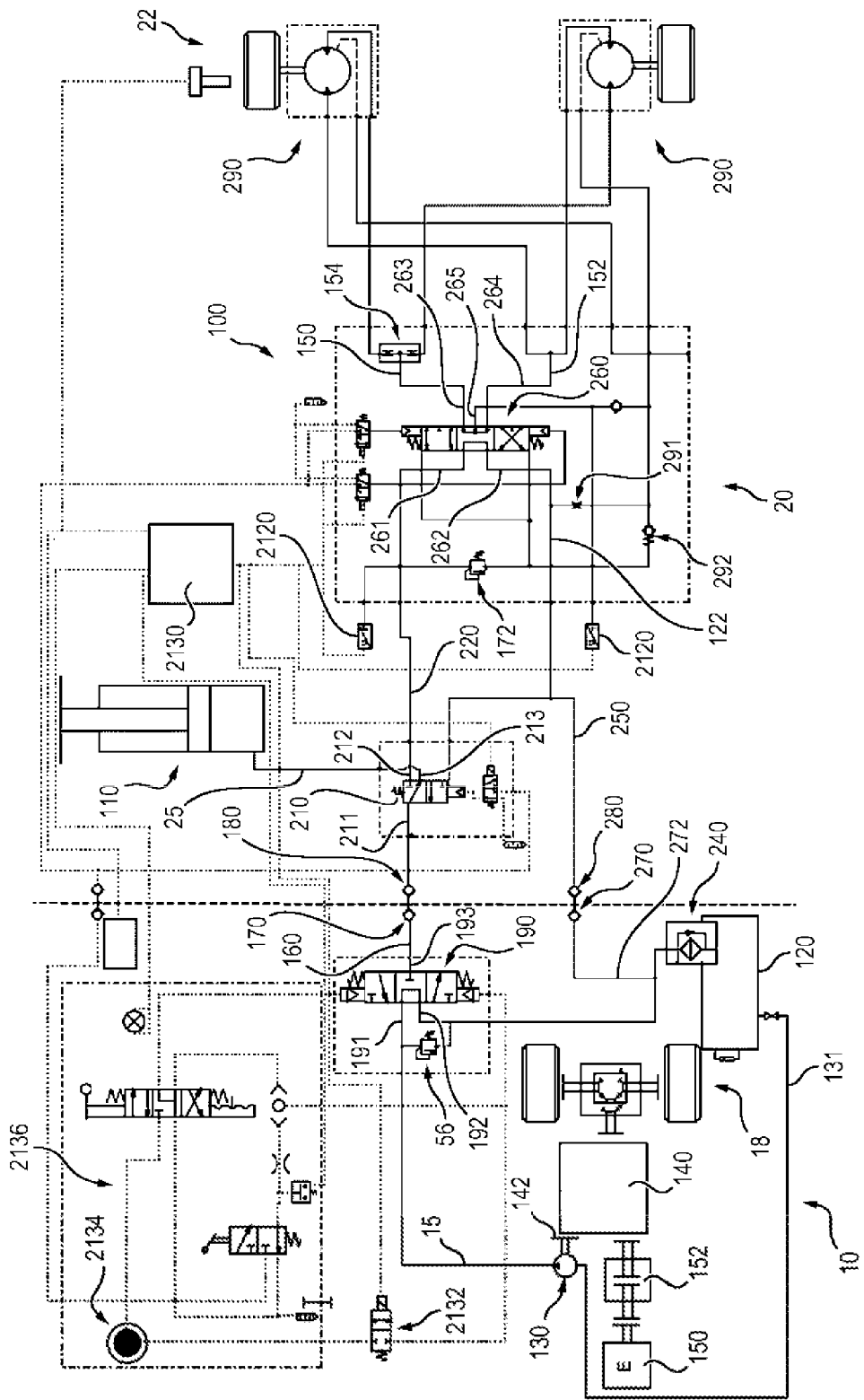

FIG. 7 represents an embodiment of a circuit that comprises a sensor 2120 adapted to switch a component of the system, in this case to stop the pump 130, during the detection of a deficiency.

In this case, according to the embodiment illustrated in FIG. 7, the sensor 2120 is adapted to measure pressure at the inlet of the assistance circuit 100 and to send a signal corresponding to a central unit 2130 which is adapted to steer a valve 2132 itself adapted to ensure the switching of a distributor 190 for interrupting the application of the pressure of the pump 130 towards the trailer.

FIG. 7 shows:
a. a towing vehicle 10 which carries:
a main engine 150, for example a heat engine,
a clutch 152 associated with the engine 150,
a gearbox 140 connected to the outlet of the clutch 152 and interposed between the clutch 152 and an engine axle 18,
a power take-off 142 directly or indirectly driven by the main engine 150 and placed for this purpose either on an outlet of the engine 150, or at the outlet of the gearbox 140,
a hydraulic machine forming a pump 130 driven by the power take-off 142,
a tank 120, a suction duct 131 that connects the tank 120 to the inlet of the pump 130 and a supply duct 15 connected to the outlet of the pump 130,
a selection distributor 190 (three-way, three-position distributor having a first inlet 191 connected to the supply duct 15, a second inlet 192 connected to the tank 120 and an outlet 193 connected to the supply connector 170 so that in a first position of the distributor 190, the two inlets 191 and 192 are connected together, so that the flow rate of the pump 130 is directly redirected towards the tank 120 while the outlet 193 is isolated from the pump, in a second position, the first inlet 191 is connected to the outlet 193 and the flow rate of the pump 130 can be used to supply a cylinder 110 or to supply the assistance, and in a third position, the second inlet 192 is connected to the outlet 193 so that the cylinder 110 can be drained towards the tank 120),
a pressure limiter 56 placed between the inlets 191 and 192,
a supply connector 170,
a return connector 270,
a return duct 272 placed between the return connector 270 and the tank 120,
a filter 240 placed on the return duct 272,
the aforementioned valve 2132,
a pneumatic accumulator 2134,
a steering assembly 2136 placed in the operator compartment of the tractor and adapted to steer the central processing unit 2130 and the selection valve 210,
b. a trailer 20 which carries:
a supply connector 180 intended to be connected to the connector 170, and
a return connector 280 intended to be connected to the connector 270,
a cylinder 110, for example a cylinder ensuring a tipping, lifting, stabilizing function or other accessory functions
a supply duct 25 of the cylinder 110, connected to the supply connector 180, via the valve 210, so that when the pump 130 is activated and the distributor 190 is in the second position, the cylinder 110 is supplied via links 15 and 25 and the connectors 170, 180, while when the distributor 190 is switched to third position, the cylinder 110 can be discharged via the line 25, and the connectors 170, 180 towards the tank 120,
a distributor 210 allowing a selection between the supply of the afore-mentioned cylinder 110 or the assistance circuit 100 (typically a three-way, two-position type distributor 210, one inlet 211 of which is connected to the connector 180, two outlets 213, 212 are connected respectively to the supply duct 25 of the cylinder 110 and to a supply line 120 of the assistance circuit 100, so that in a first position, the inlet 211 is connected to the outlet 212, the cylinder 110 is then supplied, while the circuit for driving an assistance to the driving 100 is not supplied, in the second position, conversely, the inlet 211 is connected to the outlet 213, so that the cylinder 110 is not supplied and on the contrary, the driving assistance circuit 100 is supplied by the supply line and the connectors 170, 180,
a high-pressure line 150 and a low-pressure line 152,
two engines 290 connected in parallel and associated respectively with the right and left wheels of an axle 22, an inlet of each engine 290 being connected to the high-pressure line 150, preferably via a flow rate divider distributor 154, while the outlets of the engines 290 are connected in parallel to the low-pressure line 152,
a return line 122 connected to the connector 280,
a distributor 260 (for example a five-way, three position distributor interposed between, on the one hand, the supply line 220 and the return line 122 and, on the other hand, the high-pressure line 150 and the low-pressure line 152, the inlets 261, 262 of the distributor 260 being respectively connected to the supply line 220 and to the return line 122, a first outlet 263 of the distributor 260 is connected to the inlets of the engines 290, more precisely to the inlet of the divider 154, a second outlet 264 of the distributor 260 is connected to the outlets of the engines 290, the third outlet 265 of the distributor 260 is connected to the return line 122 by a duct 166, so that in a first rest position, the two inlets 261, 262 of the distributor 260 are connected together and the three outlets 263, 264, 265 are also connected together, in this position, the assistance circuit is short-circuited; when the assistance selected but not activated, and therefore the supply of the cylinder 110 is not selected, the oil pumped by the pump 130 is returned to the tank 120 by the return lines 122, 126, the supply and return ducts of the engines 290 are not supplied, and are connected to the pressure-free oil tank 120, through the outlet 265 and the duct 166 that forms a drain line of the engines; in a second position, the first inlet 261 is connected to the outlet 263 and the second inlet 262 is connected to the second outlet 264, the engines 290 are then supplied by the pump 130 via the ducts 220, 122 in the forward direction corresponding to a first direction of rotation of the engine, and in the third position of the distributor 260, the first inlet 261 is connected to the second outlet 264 and the second inlet 262 is connected to the first outlet 263, the engines 290 are then driven in the opposite direction of rotation, in reverse), the aforementioned sensor 2120 which measures the pressure at the inlet of the assistance circuit 100 and communicates with the central unit 2130,
a leakage flap 292 which defines the pressure in the casing of the engines 290, at the outlet of a restriction 291,
a pressure limiter 172 placed between the supply line 220 and the return line 122.

In synthesis, the additional means illustrated in FIGS. 3 to 7 are adapted to:
either close the supply line of the tipping cylinder 110 (by means of the safety valve 2110),
or impose a rest position of the selection valve 210 different from the supply position of the tipping cylinder 110 (closed-center or bistable valve or normally oriented valve on assistance)

or detect a pressure variation by sensors 2120, representing the loss of signal, (for example supply of the cylinder 110 during assistance), and cut-off the hydraulic supply.

The invention claimed is:

1. A hydraulic system comprising:
a hydraulic pump of a towing vehicle;
a hydraulic hose connected to an outlet of the hydraulic pump;
a cylinder of a trailer configured for lifting the trailer relative to the towing vehicle;
a connector at an outlet of the hydraulic hose for connecting to a complementary socket of the trailer for supplying the cylinder;
a driving assistance circuit having a supply duct and a return duct and configured for feeding a wheel motor of the trailer; and
a circuit selector for selectively connecting the complementary socket towards the cylinder or towards the supply duct of the driving assistance circuit, wherein the selector is configured for being at rest in a position of active driving assistance; and the return duct of the driving assistance circuit for connecting to a tank of the towing vehicle.

2. The hydraulic system according to claim 1, wherein the circuit selector is a three-way selector comprising:
an inlet for connecting to the complementary socket; and
first and second outlets for respectively connecting to the supply duct of the driving assistance circuit and to the cylinder,
the inlet being connected to the first outlet in a first position of the three-way selector and the inlet being connected to the second outlet in a second position of the three-way selector.

3. The hydraulic system according to claim 1, further comprising a filter on the return duct.

4. The hydraulic system according to claim 1, wherein the driving assistance circuit comprises at least one radial piston engine of a wheel of the trailer.

5. The hydraulic system according to claim 1, wherein the return duct opens into a cap of the tank.

6. The hydraulic system according to claim 1, further comprising a three-way three-position control distributor interposed between the hydraulic pump and the hydraulic hose for alternatively:
connecting the outlet of the hydraulic pump to the hydraulic hose or to the tank; or
connecting the hydraulic hose to the tank.

7. The hydraulic system according to claim 1, wherein the circuit selector is configured for being steered by a control diverted from its primary normal use.

8. The hydraulic system according to claim 7, wherein the circuit selector is steered by a switch of an operator compartment.

9. The hydraulic system according to claim 1, further comprising safety means for:
ensuring that an oil flow rate generated by the hydraulic pump cannot actuate a wrong hydraulic component in an event of deficiency; and
guaranteeing that means for controlling a fluid stream or for cutting-off the fluid stream remain in a desired position in order to prevent an unexpected supply of a wrong component,
the safety means for either:
closing a supply line of the cylinder;
imposing a rest position of the circuit selector different from a supply position of the cylinder; or detecting a pressure variation by sensors representing a loss of signal and cutting-off the hydraulic supply.

10. The hydraulic system according to claim 9, further comprising at least one position or pressure sensor for switching a component of the hydraulic system during a detection of a deficiency.

11. The hydraulic system according to claim 10, comprising a pressure sensor for:
measuring a pressure at the supply line of the cylinder and/or the driving assistance circuit; and
switching a component of the hydraulic system during the detection of the deficiency.

12. The hydraulic system according to claim 10, comprising at least one position or pressure sensor for switching a component of the hydraulic system during the detection of a deficiency to:
isolate the hydraulic pump;
cut-off a supply of the hydraulic pump; or
interrupt a flow rate of the hydraulic pump by steering a valve associated with the hydraulic pump.

13. The hydraulic system according to claim 9, wherein the circuit selector comprises a bistable valve.

14. The hydraulic system according to claim 9, wherein a safety valve is interposed between an outlet of the circuit selector and an inlet of a circuit of the safety valve.

15. The hydraulic system according to claim 14, wherein the circuit selector is open towards the circuit of the safety valve, while the safety valve is a closed cut-off valve, but open to order.

16. The hydraulic system according to claim 9, wherein the circuit selector is a closed-center three-position valve.

17. The hydraulic system according to claim 9, wherein the safety means are for closing the supply line of the cylinder by a safety valve.

18. The hydraulic system according to claim 9, wherein the safety means are for imposing the rest position of the circuit selector different from the supply position of the cylinder by a closed-center valve, a bistable valve or a valve oriented on assistance.

19. The hydraulic system according to claim 9, wherein the safety means are for detecting the pressure variation by sensors representing a loss of signal corresponding to the supply of the cylinder during assistance.

20. A vehicle further comprising a hydraulic system according to claim 1.

21. The hydraulic system according to claim 1, wherein the connector is for supplying the cylinder of the trailer and for tipping.

22. A method for producing a circuit for assisting a driving of a trailer,
the method comprising placing on the trailer:
a cylinder configured for lifting the trailer relative to the towing vehicle;
a driving assistance circuit having a supply duct and a return duct and configured for feeding a wheel motor of the trailer; and
a circuit selector for connecting a complementary socket of the trailer to allow a supply of the cylinder of the trailer,
the circuit selector for selectively connecting the complementary socket either towards the cylinder or towards the supply duct of the driving assistance circuit, wherein the selector is configured for being at rest in a position of active driving assistance; and the return duct of the driving assistance circuit for connecting to a tank of a towing vehicle.

23. The method according to claim 22, further comprising:
for a tipping procedure:
deactivating an assistance by control of the circuit selector;
driving a hydraulic pump; and
controlling a tipping; and,
for an assistance procedure:
selecting an assistance mode by control of the circuit selector; and
putting the hydraulic pump into service.

24. A hydraulic system comprising:
a hydraulic pump of a towing vehicle;
a hydraulic hose connected to an outlet of the hydraulic pump;
a connector at an outlet of the hydraulic hose for connecting to a complementary socket of a trailer for supplying a cylinder of the trailer; and
a circuit selector for selectively connecting the complementary socket towards the cylinder or towards a supply duct of a driving assistance circuit and a return duct of the driving assistance circuit for connecting to a tank of the towing vehicle,
wherein the circuit selector is a three-way selector, configured for being at rest in a position of active driving assistance, comprising:
an inlet for connecting to the complementary socket; and
first and second outlets for respectively connecting to the supply duct of the driving assistance circuit and to the cylinder,
the inlet being connected to the first outlet in a first position of the three-way selector and the inlet being connected to the second outlet in a second position of the three-way selector.

25. A hydraulic system comprising:
a hydraulic pump of a towing vehicle;
a hydraulic hose connected to an outlet of the hydraulic pump;
a connector at an outlet of the hydraulic hose for connecting to a complementary socket of a trailer for supplying a cylinder of the trailer;
a circuit selector for selectively connecting the complementary socket towards the cylinder or towards a supply duct of a driving assistance circuit and a return duct of the driving assistance circuit for connecting to a tank of the towing vehicle; and
a three-way three-position control distributor interposed between the hydraulic pump and the hydraulic hose for alternatively:
connecting the outlet of the hydraulic pump to the hydraulic hose or to the tank; or connecting the hydraulic hose to the tank.

* * * * *